Feb. 27, 1962 L. W. ERATH 3,023,403
MAGNETIC DELAY LINE
Filed May 10, 1957 3 Sheets-Sheet 1

INVENTOR
LOUIS W. ERATH
BY Thomas O. Arnold
ATTORNEY

Feb. 27, 1962 L. W. ERATH 3,023,403
MAGNETIC DELAY LINE
Filed May 10, 1957 3 Sheets-Sheet 2

INVENTOR
LOUIS W. ERATH

BY Thomas O. Arnold
ATTORNEY

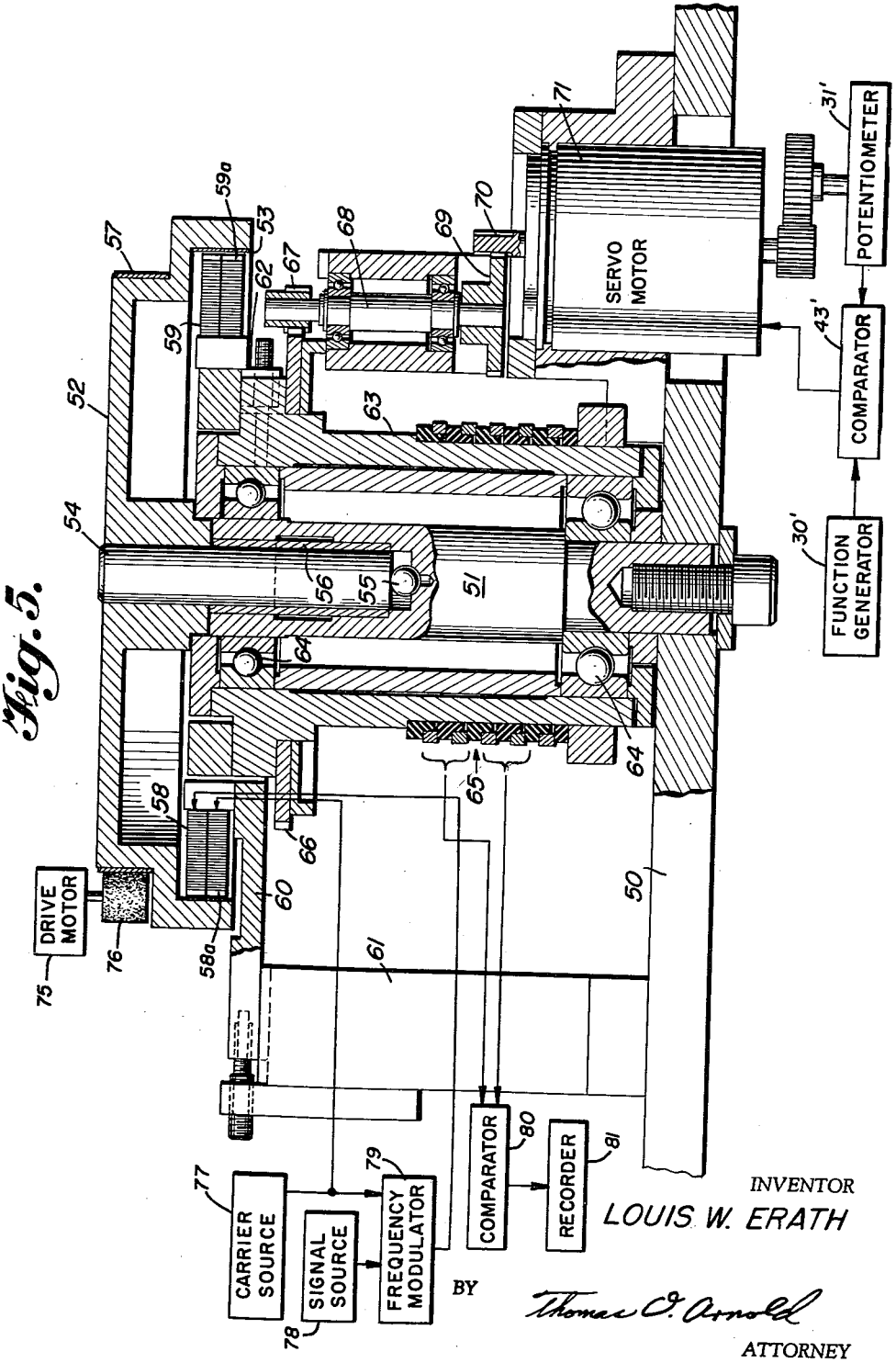

United States Patent Office 3,023,403
Patented Feb. 27, 1962

3,023,403
MAGNETIC DELAY LINE
Louis W. Erath, Houston, Tex., assignor, by mesne assignments, to Dresser Industries, Inc., Dallas, Tex., a corporation of Delaware
Filed May 10, 1957, Ser. No. 658,277
5 Claims. (Cl. 340—174.1)

This invention relates to a magnetic delay line and, more particularly, to a device for delaying a signal in accordance with a predetermined varying function of time.

There are many uses for apparatus capable of furnishing a variable delay for an electrical signal, especially where this delay must vary with respect to time. The apparatus of this invention is designed for such uses.

One particular instance of a need for providing a variable delay for an electrical signal is found in the field of geophone signal recording. Seismic prospecting using geophones is perhaps the most widely used method of predicting the presence or absence of oil-bearing strata beneath the surface of the earth. In this method, a shot is detonated, usually beneath the surface of the earth, and the resultant seismic waves are detected at a plurality of spaced geophones on the surface of the earth. The signals vary in amplitude with respect to time, and additionally vary according to the characteristics of the various strata underneath the surface of the earth, particularly in accordance with reflections obtained from interfaces each between two strata of different characteristics.

It is well known that seismic signals are obtained from geophones are usually recorded on an oscillograph recorder to furnish a chart showing amplitude variations of the signals with respect to time. It is also known that it is difficult to interpret the significance of amplitude changes in these signals, and one method of decreasing this difficulty is to correct the signal with respect to time before recording it with the oscillograph. This correction is ordinarily made in accordance with the so-called "T-delta T" curve. The term delta T is dependent upon the distance between the shot point and the geophone, the velocity of seismic waves in the earth at the locality and the time for vertical travel to and return from the interface from which reflections are being obtained at the moment. The curve may be obtained by calculating the delta T from known or estimated velocity data, for increasing T.

If correction for normal moveout or stepout is made, compression of the geophone signals on the time scale of the record is avoided and the significant information thereon can be directly interpreted from the time scale.

Correction of the time relationship of geophone signals in accordance with this T-delta T function has been made in the past by many different means. One apparatus which has been used for such correction includes a mechanical cam which has its surface generated to vary in accordance with the shape of the T-delta T curve. It is relatively difficult to generate such a cam, and a new cam must be prepared for each new T-delta T curve so that this method is objectionable to some extent.

The object of this invention is to provide time delay correction for geophone signals in accordance with the T-delta T curves without the use of mechanical cams but rather using the principles of magnetic recording.

The apparatus, generally speaking, functions as a magnetic delay line and includes a magnetic record member moved at constant speed with respect to displaced magnetic recording and pickup heads. The time delay between recording and detection by the pickup head varies with the extent of displacement therebetween, and the apparatus further includes means for moving one of the heads with respect to the other to change this displacement, this latter means being driven by a function generator which supplies a voltage varying with respect to time in accordance with a predetermined function.

As indicated above, this invention is intended particularly for use in correction for move-out of geophone signals but it will be evident that it is not limited to such use. The invention may be employed wherever it is desired to delay a signal in accordance with a predetermined varying function of time.

The invention will now be more fully described in conjunction with a preferred embodiment thereof shown in the accompanying drawings.

Figure 1:
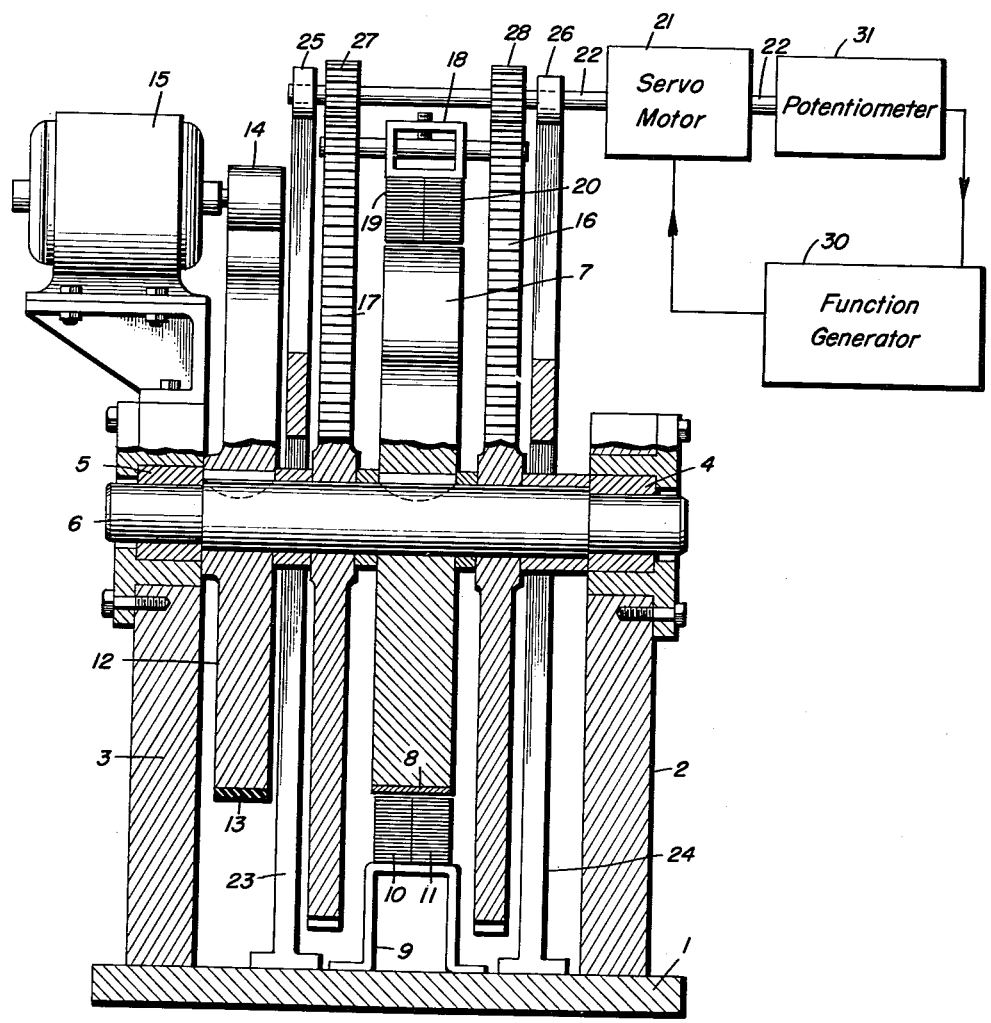
FIG. 1 is a vertical elevational view partly in section of the magnetic recording elements of the apparatus showing some of the cooperating elements in block form.

Referring first to FIG. 1, the magnetic recording apparatus includes a supporting structure comprising a base 1 having a pair of upstanding members 2 and 3 for supporting the bearings 4 and 5 of a horizontally-extending shaft 6. Shaft 6 has a drum 7 keyed thereto which carries on its periphery a magnetic recording element 8 which may be the usual magnetic record tape.

A mounting bracket 9 supported from the base 1 carries a pair of magnetic recording heads 10 and 11, which are shown in rather schematic form since they may be of conventional design. The recording heads are positioned closely adjacent the recording member 8 to record thereon signals supplied them.

The shaft 6 is driven by a cylindrical member 12 keyed to the shaft and which has a frictional sleeve 13 affixed to its outer periphery. Sleeve 13 engages a roller 14 fixed to the shaft of an electrical motor 15 which is mounted on supporting member 3. The motor 15 is adapted to be driven at constant speed by a suitable source of electrical supply (not shown).

Also mounted on the shaft 6 but rotatable with respect thereto are a pair of spur gears 16 and 17 of substantially larger diameter than that of drum 7. Gears 16 and 17 carry a supporting structure 18 which mounts a pair of magnetic pickup heads 19 and 20. The pickup heads may also be of conventional design and are positioned closely adjacent the recording member 8 to pick up electrical signals recorded thereon by recording heads 10 and 11.

It will be evident that the delay between recording of a signal on the recording element by recording heads 10 and 11 and pickup for detection of the signal by heads 19 and 20 will be dependent upon the speed of drive of the recording member and the spacing between the recording and pickup heads. Since the speed of drive is maintained constant, the time delay will be dependent solely on variations in angular distance between the recording and pickup heads.

The pickup heads 19 and 20 are adapted to be rotated about the shaft 6 by apparatus including a servo motor 21 which drives a shaft 22 whenever a voltage is supplied by the servo motor. Shaft 22 is supported from base 1 by brackets 23 and 24 which form, at their upper ends, supports for bearing sleeves 25 and 26 on the shaft. The shaft also carrier a pair of small gears 27 and 28 which mesh with gears 17 and 16, respectively, so as to drive the gears and the pickup heads supported thereby with rotation of shaft 22 of the servo motor.

Servo motor 21 is supplied with electrical voltage from a function generator 30 which will be more fully described hereinafter and which is adapted to generate a voltage having an amplitude varying with time in accordance with a predetermined function. The servo motor 21 also drives a feedback potentiometer 31 to develop an output voltage which is compared with the output of the function generator, so that the servo motor may be driven in accordance with the difference between these voltages. The voltages developed by the potentiometer 31 is a measure of the relative positions of the pickup heads and the recording heads.

Figure 2:
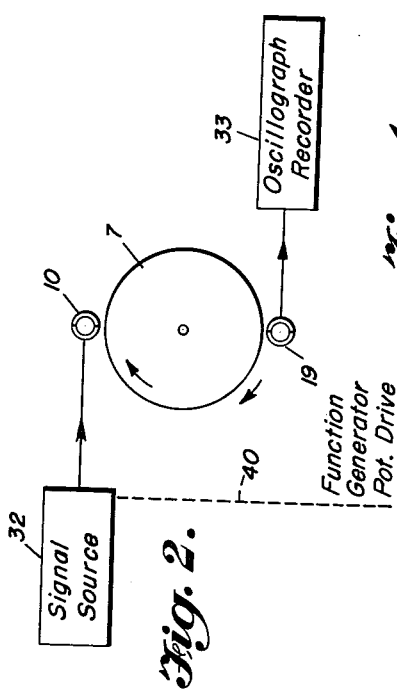
FIG. 2 is a diagrammatic view of the relationship between the magnetic recorder, the signal source, and the usual oscillograph recorder.

Referring now to FIGURE 2 showing the conventional magnetic recording arrangement for geophone signal recording, the geophone signal source 32 supplies signals to one of the recording heads 10, so that the signals are recorded on the record element carried by drum 7. The signals recorded on the record element are then picked up after a time delay determined by the angular spacing between the recording head 10 and pickup head 19. The output of pickup head 19 is connected to the conventional oscillograph recorder 33 so that the geophone signals may be shown in visible form.

As indicated in FIG. 2, the recording drum 7 is rotated in clockwise direction, while the pickup head 19 may be driven in either a clockwise or a counter-clockwise direction to extreme positions adjacent the recording head. Thereby, the delay between recording and pickup of the geophone signal may be increased or decreased continuously in accordance with the characteristics of the movement of the pickup head toward or away from the recording head.

Figure 3:
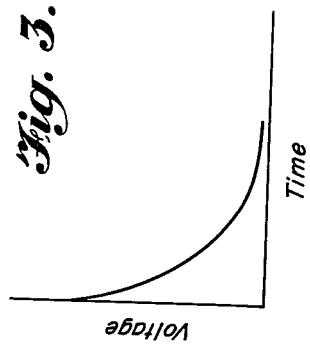
FIG. 3 is a graph of the output voltage with respect to increasing time which may be obtained with the function generator of the invention.

FIG. 3 is a simplified showing of a voltage versus time characteristic that may be obtained by the function generator to be described. Those skilled in the art will appreciate that the graph of FIG. 3 is similar to the T-delta T curve. As will be evident after the following description, this voltage versus time curve may be made to simulate the T-delta T curve for any region of geophone operations, and for any spacing of the geophone from the shot point.

Figure 4:
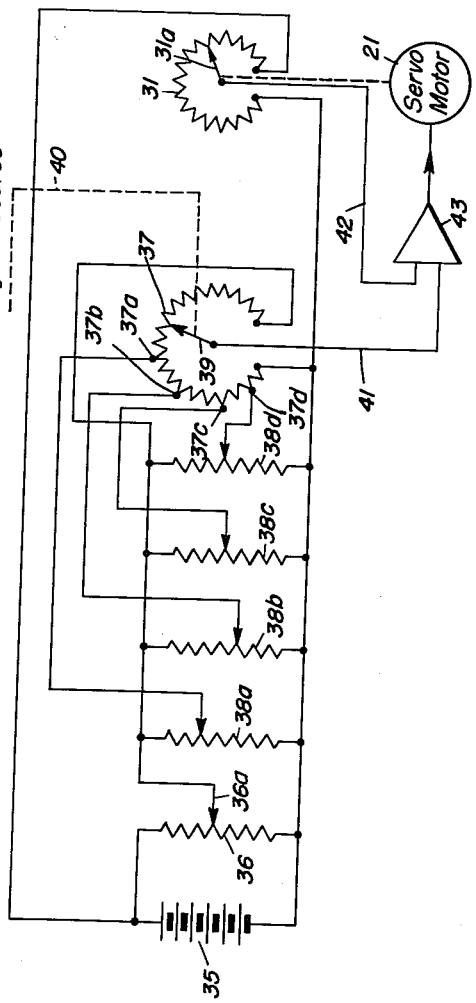
FIG. 4 is a schematic diagram of the function generator of the invention together with the feedback means driven by the servo motor of FIG. 1; and, FIG. 5 is a vertical sectional view of the magnetic recording and servo elements of a modification of the apparatus of FIG. 1, showing schematically the various other elements of the combination which are connected to the recording apparatus.

The function generator of FIG. 4 includes a source of constant voltage shown as battery 35. A manually-adjustable potentiometer 36 is connected directly across the terminals of this battery for a purpose to be explained. A tapped potentiometer 37 is connected between the negative terminal of battery 35 and the movable contact 36a of potentiometer 36. The taps of the potentiometer, shown for sake of example at 37a, 37b, 37c, and 37d, are connected to the movable contacts of a corresponding plurality of manually-settable potentiometers 38a–38d respectively. One side of each of these potentiometers 38 is connected to the negative side of battery 35 and the other side is connected to the movable contact 36a of potentiometer 36.

The movable contact 39 of tapped potentiometer 37 is designed to be driven from the geophone signal source diagrammatically indicated at 40, through a connection so that the movable contact rotates synchronously with the geophone signal time scale. This may be achieved through a suitable constant frequency signal indicating increasing time and which may drive a motor which rotates the potentiometer contact.

Feedback potentiometer 31 is connected directly across battery 35 and has its movable contact 31a driven by the servo motor, as explained above.

Movable contact 39 of the tapped potentiometer is connected to lead 41 and movable contact 31a of the feedback potentiometer is connected to lead 42, these leads being connected to the input of amplifier 43. Amplifier 43 compares the voltage obtained from the function generator (the voltage between movable contact 39 and the negative side of the battery) with the feedback voltage indicative of the position of the pickup heads (the voltage between movable contact 31a and the negative side of the battery) and delivers an output voltage proportional to their difference to servo motor 21.

The operation of the apparatus described will be apparent from the above. The shape of the characteristic curve of FIG. 3 may be duplicated by proper selections of the various positions of the movable contacts of potentiometers 38a–38d. The voltage output will consist of a series of straight line segments which can be made to approximate closely any T-delta T curve. The potentiometer 36 is provided to permit scaling of the move-out or step-out function, so that the same apparatus may be used for geophones at different distances from the shot point. With the movable contact 36a at the positive end of the potentiometer, the move-out function may correspond to the T-delta T curve for the most remote geophone, and the movable contact can be moved toward the negative end to positions corresponding to the locations of nearer geophones.

The output of the function generator, then, is an electrical voltage varying in amplitude with time similarly to the graph of FIG. 3, this variation corresponding to the T-delta T correction for the particular signal being recorded. Servo motor 21 will then drive pickup head 19 away from recording head 10, in accordance with this function, so that the delay between recording and pickup will increase with decreasing rate in accordance with the same function. A signal corrected for move-out will then be supplied oscillograph recorder 33.

A disadvantageous feature of movement of one of the recording and pickup heads with respect to the other during the recording process with an F.-M. carrier recording system is that noise signals which tend to mask the information signals are generated. In order to compensate for this feature, an unmodulated carrier signal may be recorded on record member 8 by recording head 11 and picked up or detected by pickup head 20. This signal will have the same noise content as the geophone signal recorded and picked up by heads 10 and 19. The signals may then be compared, or subtracted, before recording in the oscillograph recorder so that the noise voltages cancel. It will be appreciated that the recording heads could be moved relative to the pickup heads, rather than vice versa, if desirable.

Referring now to FIG. 5, the modification of the recording apparatus therein shown is supported from a base 50 having a stud-mounted shaft 51 extending upwardly therefrom. A drum 52 having a magnetic oxide coating 53 around the periphery of a portion of its inner surface is supported from stud shaft 51 by a drum shaft 54. Thrust bearing 55 and side bearing 56 permit free rotation of shaft 54 and drum 52 with respect to stud shaft 51.

Drum 52 is adapted to be driven by a constant speed motor 75 through a drive member 76 engaging its outer surface 57, so as to rotate its magnetic recording member or surface 53 past fixed recording heads 58 and 58a and movable pickup heads 59 and 59a positioned closely adjacent thereto.

Fixed recording heads 58 and 58a are supported from base 50 by an adjustable mounting 60 (for moving the heads toward and away from recording surface 53) attached to a standard 61.

The movable pickup heads 59 and 59a are supported by an adjustable mounting 62 (for the same purpose as mounting 60) attached to a cylindrical housing 63. The housing is mounted in ball bearings 64 to permit its free rotation with respect to stud shaft 51 and carries slip rings 65 connected to pickup head 59 and adapted to be contacted by appropriate brushes (not shown). As indicated above, the pairs of recording and pickup heads may be used to compensate for noise generated in the recording operation. For this purpose, a source of carrier frequency oscillations 77 may be connected directly to recording head 58a, while the output of signal source 78 may modulate the carrier in frequency modulator 79 to provide an input for recording head 58. The modulated output of pickup head 59 may then be connected to one input of comparator 80, while the unmodulated output of pickup head 59a is connected to the other input. The comparator will then subtract its two inputs from each other to provide a resultant signal which is substantially free from recording noise. After appropriate detection and amplification, the signal is then supplied to an appropriate recorder 81.

Housing 63 carries a spur gear 66 which meshes with an idler gear 67 mounted on idler shaft 68. A second idler gear 69 meshes with a spur gear 70 driven by servo motor 71. Servo motor 71 fills the same function as servo motor 21 of FIGS. 1 and 4 and is adapted to be driven by the same type of function generator as that identified at 30 and to drive a potentiometer such as that shown at 31, in those figures. Specifically, the function generator 30' may supply its output to a comparator 43' of the same type as comparator 43 of FIG. 2, which comparator is also supplied with the output of potentiometer 31' (of the same type as the potentiometer 31 of FIGS. 1 and 4), driven by servo motor 71. The comparator then drives the servo motor in accordance with the difference between these two voltages to move the pickup heads 59 and 59a, with respect to recording heads 58 and 58a, in the manner required by the function generator output.

The apparatus of FIG. 5 operates in the same fashion as the corresponding parts of the apparatus of FIG. 1, so the description need not be repeated.

Many further changes could be made in the apparatus described without departure from the scope of the invention. The invention, therefore, is not to be considered limited to the specific embodiment shown but rather only by the scope of the appended claims.

I claim:

1. A magnetic delay line for delaying a signal in accordance with a predetermined varying function of time comprising a frame, a drum on said frame carrying a magnetic record member along its inner surface, means for rotating said drum at a constant speed, a housing on said frame coaxial with said drum and mounted for rotation with respect thereto, a magnetic recording head, a magnetic pick-up head spaced from the recording head in the direction of movement of the record member, one of said heads being supported by said housing and the other being fixed on said frame and both being positioned inward of said record member and closely adjacent thereto to record thereon and pick up therefrom, respectively, a signal, a servo motor for moving said one head, a function generator for supplying to said servo motor an electrical voltage varying with time according to said function, a potentiometer driven by said servo motor for developing a second electrical voltage having an amplitude indicative of the relative position of said one head, and means for comparing said first mentioned and said second electrical voltage operative to supply said servo motor with the difference between them.

2. In a device for use in seismographic and related work wherein signals are detected, are further handled in frequency modulated form and are recorded magnetically, and wherein the handling of such signals includes time re-orientation of such signals, apparatus comprising a cylindrical record member mounted and powered for continuous rotation at constant speed about an axis, two paths on the inside of said record member being adapted to have magnetically recorded thereupon at least two signals;

first and second pairs of heads, the two heads in each pair being secured to one another, the pairs of heads being positioned within said record member in spaced relation one to the other with the first head of each pair adapted to scan one of said paths and the second head of each pair adapted to scan the second of said paths, the first of said pairs of heads being recording heads with one head recording a frequency modulated signal carrying intelligence in the modulations and the other head recording a signal of typical carrier frequency without frequency modulations, the second of said pairs of heads being pickup heads with one of said second pair of heads being adapted to pickup respectively the signals recorded by each of said first pair of heads, one of said pairs of heads being mounted to be rotatable through a limited arc about the axis of rotation of said cylindrical record member;

means for moving said rotatable pair of heads within its arc of rotation at varying speed in accordance with a predetermined function;

circuit means for mixing in phase opposition the modulations induced in the two signals by the recording and pickup with incidental movement of heads and owing to variations in relative speed between heads and recording paths and variations in distance between heads and recording path, whereby such frequency modulations as are induced in said intelligence signal by the recording and pickup with incidental movement of heads are substantially eliminated from the resultant intelligence signal.

3. A magnetic delay line for delaying a signal in accordance with a predetermined varying function of time comprising a base, a stub-mounted stationary shaft extending upwardly therefrom, a second shaft coaxial with said first-mentioned shaft and supported thereby for rotation with respect thereto, a drum fixed to said second shaft for rotation therewith, means for rotating said drum, said drum having an inner cylindrical surface coaxial with said second shaft and operable to carry a continuous magnetic record member thereon, a first magnetic head fixed with respect to said base and positioned closely radially inwardly of said surface for cooperation with the magnetic record member, a housing coaxial with said first and second shafts and rotatably supported with respect thereto, a second magnetic head mounted on said housing and positioned closely radially inwardly of said surface for cooperation with the magnetic record member, one of said first and second heads being operable to record a signal on the record member and the other being operable to pick up a signal therefrom, a servo motor having its shaft operably connected to said housing to rotate it at a speed and in a direction determined by the amplitude and polarity of the voltage supplied to the motor, a function generator for supplying a first electrical voltage varying with time according to said function, a potentiometer driven by said servo motor for developing a second electrical voltage having an amplitude indicative of the position of said second head with respect to said first head, and means for comparing said first and said second voltages operative to supply said servo motor with the difference between them.

4. The apparatus of claim 3 in which both of said heads are adjustably mounted for movement toward and away from said surface.

5. The apparatus of claim 3 in which said means for rotating the drum includes an outer cylindrical frictional surface on said drum coaxial with said second shaft.

References Cited in the file of this patent
UNITED STATES PATENTS

| | | |
|---|---|---|
| 2,517,121 | Liston | Aug. 1, 1950 |
| 2,604,955 | Hawkins | July 29, 1952 |
| 2,650,830 | Potter | Sept. 1, 1953 |
| 2,733,425 | Williams | Jan. 31, 1956 |
| 2,800,639 | Lee | July 23, 1957 |
| 2,802,201 | Casagrande | Aug. 6, 1957 |
| 2,835,856 | Moseley | May 20, 1958 |
| 2,879,860 | Tilley | Mar. 31, 1959 |